United States Patent
Ganiger et al.

(10) Patent No.: US 11,193,390 B2
(45) Date of Patent: Dec. 7, 2021

(54) SPRING FINGER RING SUPPORT ASSEMBLY FOR A BEARING

(71) Applicant: General Electric Company, Schenectady, NY (US)

(72) Inventors: Ravindra Shankar Ganiger, Bangalore (IN); Thomas Ory Moniz, Loveland, OH (US); Satish Kumar Yadav, Bangalore (IN); Ambika Shivamurthy, Bengaluru (IN); Praveen Sharma, Bangalore (IN); Bhujabal Prashant Mahadeo, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/062,876

(22) Filed: Oct. 5, 2020

(65) Prior Publication Data

US 2021/0047940 A1 Feb. 18, 2021

Related U.S. Application Data

(63) Continuation of application No. 16/540,538, filed on Aug. 14, 2019, now Pat. No. 10,794,222.

(51) Int. Cl.
*F16C 27/04* (2006.01)
*F01D 25/16* (2006.01)
*F16C 33/58* (2006.01)

(52) U.S. Cl.
CPC ......... *F01D 25/162* (2013.01); *F01D 25/164* (2013.01); *F16C 27/04* (2013.01);
(Continued)

(58) Field of Classification Search
CPC .. F01D 25/162; F01D 25/164; F05D 2220/32; F05D 2240/50; F16C 27/04;
(Continued)

(56) References Cited

U.S. PATENT DOCUMENTS

| 1,626,188 A | 4/1927 | De Ram et al. |
| 4,971,458 A | 11/1990 | Carlson |

(Continued)

FOREIGN PATENT DOCUMENTS

| CN | 1506588 A | 6/2004 |
| EP | 1975429 A2 | 10/2008 |

(Continued)

*Primary Examiner* — Phillip A Johnson
(74) *Attorney, Agent, or Firm* — Dority & Manning, P.A.

(57) ABSTRACT

A support assembly for a bearing of a gas turbine engine including a spring finger ring positioned radially exterior to an outer race of the bearing. The spring finger ring includes an outer ring positioned radially exterior to the outer ring, an inner ring positioned radially interior to the outer ring, and a plurality of spring fingers extending between the inner and outer rings. One or more spring fingers configured as two-sided spring fingers including a first ligament coupled to the outer ring and extending at a first circumferential angle to a first radial bumper proximate to the inner ring and a second ligament coupled to the inner ring and extending at a different second circumferential angle to a second radial bumper proximate to the outer ring. The first and second radial bumpers define first and second radial gaps between the bumpers and the inner and outer rings, respectively.

20 Claims, 7 Drawing Sheets

(52) U.S. Cl.
CPC .......... *F16C 33/58* (2013.01); *F05D 2220/32* (2013.01); *F05D 2240/50* (2013.01); *F16C 2360/23* (2013.01)

(58) Field of Classification Search
CPC .... F16C 27/045; F16C 33/58; F16C 2229/00; F16C 2360/23
See application file for complete search history.

(56) References Cited

U.S. PATENT DOCUMENTS

| | | | |
|---|---|---|---|
| 5,052,828 | A | 10/1991 | Ciokajlo et al. |
| 5,421,655 | A | 6/1995 | Ide et al. |
| 5,603,574 | A | 2/1997 | Ide et al. |
| 5,791,789 | A | 8/1998 | Van Duyn et al. |
| 6,240,719 | B1 | 6/2001 | Vondrell et al. |
| 6,413,046 | B1 | 7/2002 | Penn et al. |
| 6,540,483 | B2 | 4/2003 | Allmon et al. |
| 7,288,326 | B2 | 10/2007 | Elzey et al. |
| 7,384,199 | B2 | 6/2008 | Allmon et al. |
| 7,628,542 | B2 | 12/2009 | Wada et al. |
| 7,648,278 | B2 | 1/2010 | Stout et al. |
| 7,797,922 | B2 | 9/2010 | Eleftheriou et al. |
| 8,182,156 | B2 | 5/2012 | Kinnaird et al. |
| 8,209,834 | B2 | 7/2012 | Mons et al. |
| 8,282,285 | B2 | 10/2012 | Brillon |
| 8,322,038 | B1 | 12/2012 | Heidari et al. |
| 8,337,090 | B2 | 12/2012 | Herborth et al. |
| 8,662,756 | B2 | 3/2014 | Care et al. |
| 8,727,629 | B2 | 5/2014 | Do et al. |
| 8,727,632 | B2 | 5/2014 | Do et al. |
| 8,821,029 | B2 | 9/2014 | Antunes et al. |
| 9,016,952 | B2 | 4/2015 | Bedenk |
| 9,279,449 | B2 | 3/2016 | Rouesne |
| 9,796,581 | B2 | 10/2017 | Landais et al. |
| 9,850,814 | B2 | 12/2017 | Grogg |
| 9,869,205 | B2 | 1/2018 | Gainger et al. |
| 9,926,975 | B2 | 3/2018 | Smedresman et al. |
| 10,041,534 | B2 | 8/2018 | Ganiger et al. |
| 10,450,893 | B1 | 10/2019 | Polly et al. |
| 2005/0129343 | A1* | 6/2005 | Bouchy .................. F01D 21/045 384/535 |
| 2005/0152626 | A1* | 7/2005 | Gerez .................... F01D 21/045 384/99 |
| 2006/0204153 | A1 | 9/2006 | Alam et al. |
| 2007/0031078 | A1 | 2/2007 | Hackett |
| 2008/0152483 | A1 | 6/2008 | Godleski |
| 2009/0246081 | A1 | 10/2009 | Nichols et al. |
| 2011/0286836 | A1 | 11/2011 | Davis |
| 2012/0213629 | A1 | 8/2012 | Rouesne |
| 2012/0263578 | A1 | 10/2012 | Davis et al. |
| 2013/0108202 | A1 | 5/2013 | Do et al. |
| 2013/0280063 | A1 | 10/2013 | Ganiger et al. |
| 2013/0331223 | A1 | 12/2013 | McCune et al. |
| 2015/0010387 | A1 | 1/2015 | Daimer |
| 2015/0098826 | A1 | 4/2015 | Carter et al. |
| 2015/0308510 | A1 | 10/2015 | Long et al. |
| 2017/0030221 | A1 | 2/2017 | Hopper et al. |
| 2017/0145855 | A1 | 5/2017 | Ganiger et al. |
| 2017/0226894 | A1 | 8/2017 | Ganiger et al. |
| 2017/0226927 | A1 | 8/2017 | Ganiger et al. |
| 2018/0112554 | A1* | 4/2018 | Ghosh .................... F16C 29/123 |
| 2019/0048743 | A1* | 2/2019 | Tulej .................... F01M 11/0004 |

FOREIGN PATENT DOCUMENTS

| | | | |
|---|---|---|---|
| EP | 2149681 A2 | 2/2010 | |
| EP | 2479406 A2 | 7/2012 | |
| EP | 2667046 A2 | 11/2013 | |
| JP | 2009287679 A | 12/2009 | |
| WO | WO2015/069353 A2 | 5/2015 | |
| WO | WO2015/130370 A2 | 9/2015 | |
| WO | WO-2017205315 A1 * | 11/2017 | ........... F01D 25/164 |

* cited by examiner

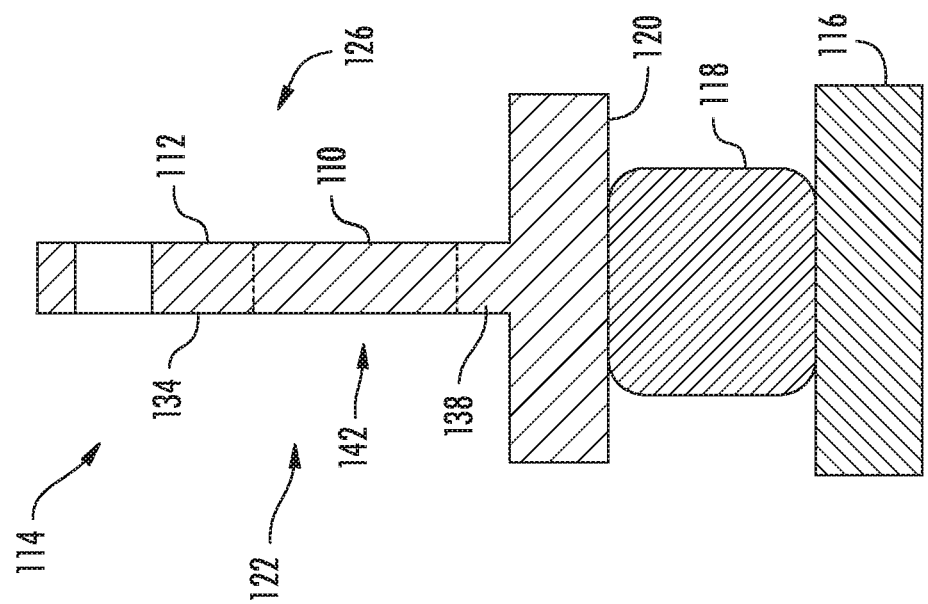
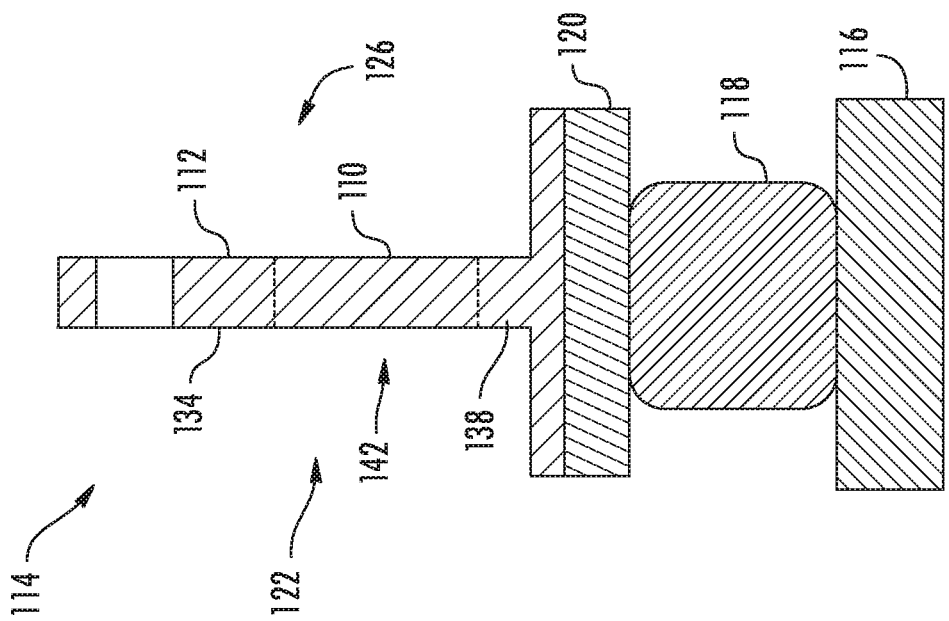

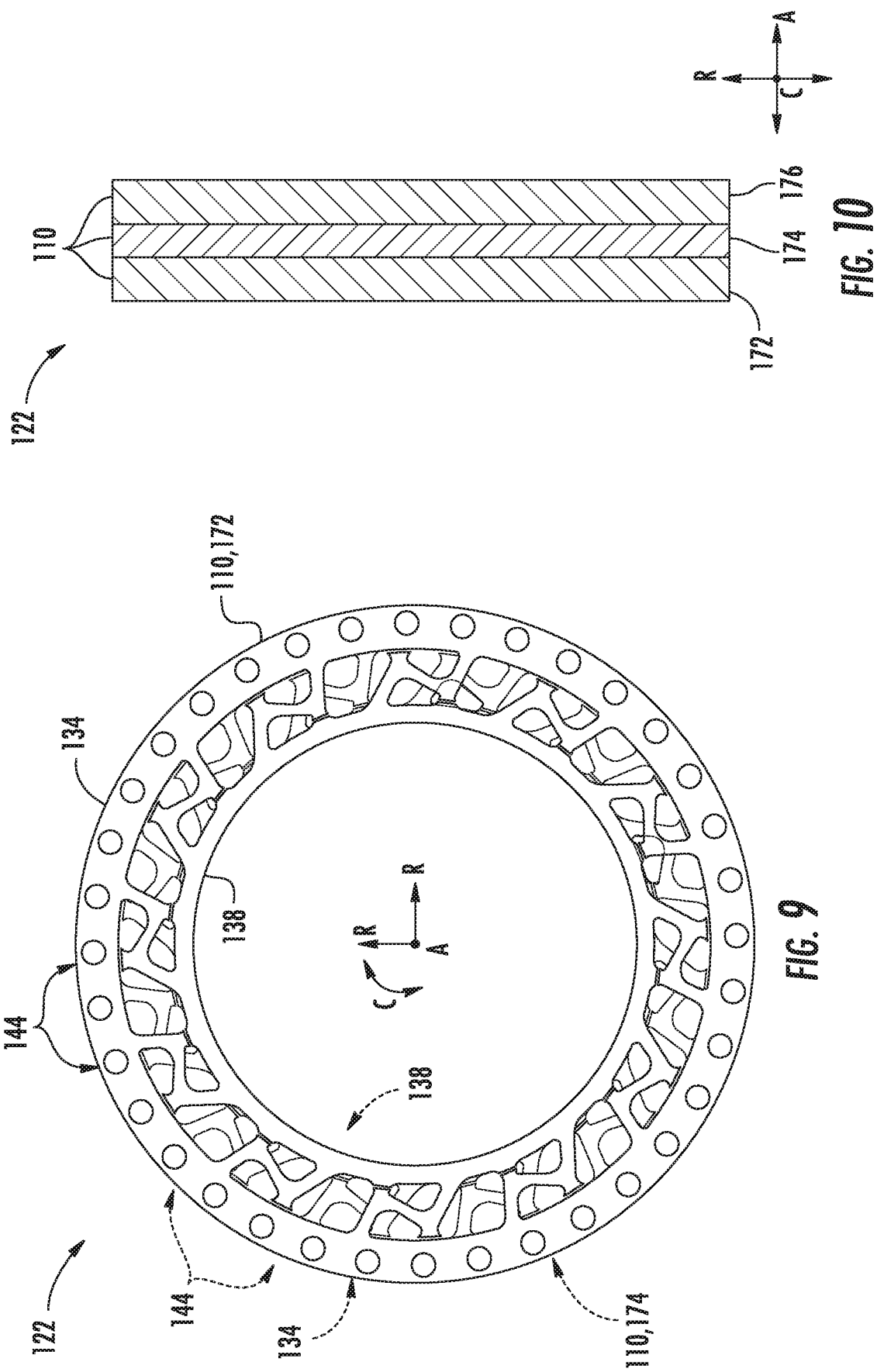

SPRING FINGER RING SUPPORT ASSEMBLY FOR A BEARING

CROSS-REFERENCE TO RELATED APPLICATION

This application is a continuation application of U.S. application Ser. No. 16/540,538 filed Oct. 14, 2019, titled "SPRING FINGER RING SUPPORT ASSEMBLY FOR A BEARING," herein incorporated by reference.

FIELD

The present subject matter relates generally to a support assembly for a bearing in a gas turbine engine, or more particularly to a support assembly including a spring finger ring for retention of the outer race of the bearing.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding the fan assembly including the fan blades.

With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

During normal engine operation, a support assembly may be provided to support the bearings of the gas turbine engine. For instance, a ball bearing assembly can be provided to retain the axial position of the HP shaft (aka HP spool), and a roller bearing assembly can be provided to act to provide radial damping of the fan/rotor system. A traditional design approach consisting of an axial spring finger housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, under no-oil conditions, as well as during conditions in which the rotor assemblies are subjected to a large amount of dynamic forces, the squeeze film dampers may not provide a desired amount of variable damping that can change with respect to the dynamic forces. Bearing assemblies may also generally include radial spring fingers, such as within the roller bearing assembly, to further dampen loads that may damage the bearing. However, such radial spring fingers may not allow for a large variation in stiffness and may be relatively large. Further, larger radial spring fingers may add undesirable weight and reduce the efficiency of the engine.

As such, a need exists for a support assembly for a bearing of a gas turbine engine that reduces the weight and size of the spring fingers as well as provides an increased variation in stiffness.

BRIEF DESCRIPTION

Aspects and advantages will be set forth in part in the following description, or may be obvious from the description, or may be learned through practice of the invention.

In one aspect, the present subject matter is directed to a support assembly for a bearing of a gas turbine engine including a shaft extending along an axial direction. The support assembly includes an outer race positioned radially exterior to the bearing such that the outer race supports the bearing. The support assembly further includes a spring finger ring positioned radially exterior to the outer race and at least partially supporting the outer race. The spring finger ring includes an outer ring positioned radially exterior to the outer race and an inner ring positioned radially interior to the outer ring and defining a gap therebetween. The spring finger ring further includes a plurality of spring fingers extending between the inner and outer rings such that the plurality of fingers provides damping of the outer race. Additionally, at least a portion of the plurality of spring fingers is configured as two-sided spring fingers. Each two-sided spring finger includes a first ligament coupled to the outer ring and extending at a first circumferential angle relative to the axial direction to a first radial bumper proximate to the inner ring at a first circumferential location to define a first circumferential side of each of the two-sided spring fingers. Each of the two-side spring fingers further includes a second ligament coupled to the inner ring at a second circumferential location and extending at a second circumferential angle relative to the axial direction to a second radial bumper proximate to the outer ring to define a second circumferential side of each of the two-sided spring fingers. The second circumferential angle different than the first circumferential angle. Moreover, each of the two-sided spring fingers defines a first radial gap between the first radial bumper and the inner ring and a second radial gap between the second radial bumper and the outer ring.

In one embodiment, the support assembly may further include an additional damper disposed radially between the outer race and at least a portion of the additional damper. In another embodiment, the second circumferential angle may be greater than the first circumferential angle. In another embodiment, the first radial bumper and/or the second radial bumper may define a circumferential width greater than a circumferential width of the first ligament and/or the second ligament. In one embodiment, each of the two-sided spring fingers may further include a third ligament coupled between the first radial bumper and the second radial bumper. In a further embodiment, the radial gap may be between 0.1 millimeters and 2 millimeters. In several embodiments, each spring finger of the plurality of spring fingers may be configured as two-sided spring fingers. In another embodiment, the spring finger ring may be integrally formed. In several embodiments, the spring finger ring may further include a shape memory alloy. In some embodiments, the spring finger ring may be prestressed.

In one embodiment, the damper may further include a squeeze film damper. In another embodiment, the damper may include a squirrel casing. In one particular embodiment, the spring finger ring may be formed integrally with the outer race. In a further embodiment, the spring finger ring may be formed integrally with the squirrel casing. In another embodiment, the spring finger ring may be formed integrally with both the squirrel casing and the outer race.

In several embodiments, the support assembly may include a plurality of spring finger rings stacked in the axial direction. In one such embodiment, the plurality of spring finger rings may include a first spring finger ring defining a first stiffness and a second spring finger ring defining a second stiffness different than the first stiffness.

In another aspect, the present subject matter is directed to a gas turbine engine defining a central axis. The gas turbine engine includes a shaft extending along the central axis. The gas turbine engine further includes a compressor attached to the shaft and extending radially about the central axis. Additionally, the gas turbine engine includes a combustor positioned downstream of the compressor to receive a compressed fluid therefrom. The gas turbine engine also includes a turbine mounted on the shaft downstream of the combustor to provide a rotational force to the compressor. The gas turbine engine further includes a bearing assembly supporting the shaft. The bearing assembly includes an inner race coupled to the shaft, a bearing positioned radially exterior to the inner race and supporting the shaft, and an outer race positioned radially exterior to the bearing such that the bearing is radially positioned between the inner and outer races. Further, the gas turbine engine includes a spring finger ring positioned radially exterior to the outer race and at least partially supporting the outer race. The spring finger ring includes an outer ring positioned radially exterior to the outer race and an inner ring positioned radially interior to the outer ring such that the inner ring and outer ring define a gap therebetween. The spring finger ring further includes a plurality of spring fingers extending between the inner and outer rings such that the plurality of fingers provides damping of the outer race. At least a portion of the plurality of spring fingers is configured as two-sided spring fingers and each includes a first ligament coupled to the outer ring and extending at a first circumferential angle relative to the axial direction to a first radial bumper proximate to the inner ring at a first circumferential location to define a first circumferential side of each of the two-sided spring fingers. Each two-sided spring finger further includes a second ligament coupled to the inner ring at a second circumferential location and extending at a second circumferential angle relative to the axial direction to a second radial bumper proximate to the outer ring to define a second circumferential side of each of the two-sided spring fingers. The second circumferential angle different than the first circumferential angle. Additionally, each of the two-sided spring fingers defines a first radial gap between the first radial bumper and the inner ring and a second radial gap between the second radial bumper and the outer ring.

In one embodiment, the gas turbine engine may further include an additional damper disposed radially between the outer race and at least a portion of the additional damper. In another embodiment, each of the two-sided spring fingers may further include a third ligament coupled between the first radial bumper and the second radial bumper. In a further embodiment, the second circumferential angle may be greater than the first circumferential angle. In an additional embodiment, the first radial bumper and/or the second radial bumper may define a circumferential width greater than a circumferential width of the first ligament and/or the second ligament. In another embodiment, the bearing may include at least one of a thrust bearing or a roller bearing. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 7 illustrates an embodiment of the support assembly where the spring finger ring is integrally formed in accordance with aspects of the present subject matter, particularly illustrating the spring finger ring formed integrally with or integrally coupled to the damper;

FIG. 8 illustrates another embodiment of the support assembly where the spring finger ring is integrally formed in accordance with aspects of the present subject matter, particularly illustrating the spring finger ring formed integrally with or integrally coupled to both the damper and the outer race;

FIG. 9 illustrates one embodiment of stacked spring finger rings that may be utilized in a support assembly in accordance with aspects of the present subject matter, particularly illustrating a front view of stacked spring finger rings; and FIG. 10 illustrates another view of the stacked spring finger rings of FIG. 9 in accordance with aspects of the present subject matter, particularly illustrating a side view of the stacked spring finger rings.

Figure 1:
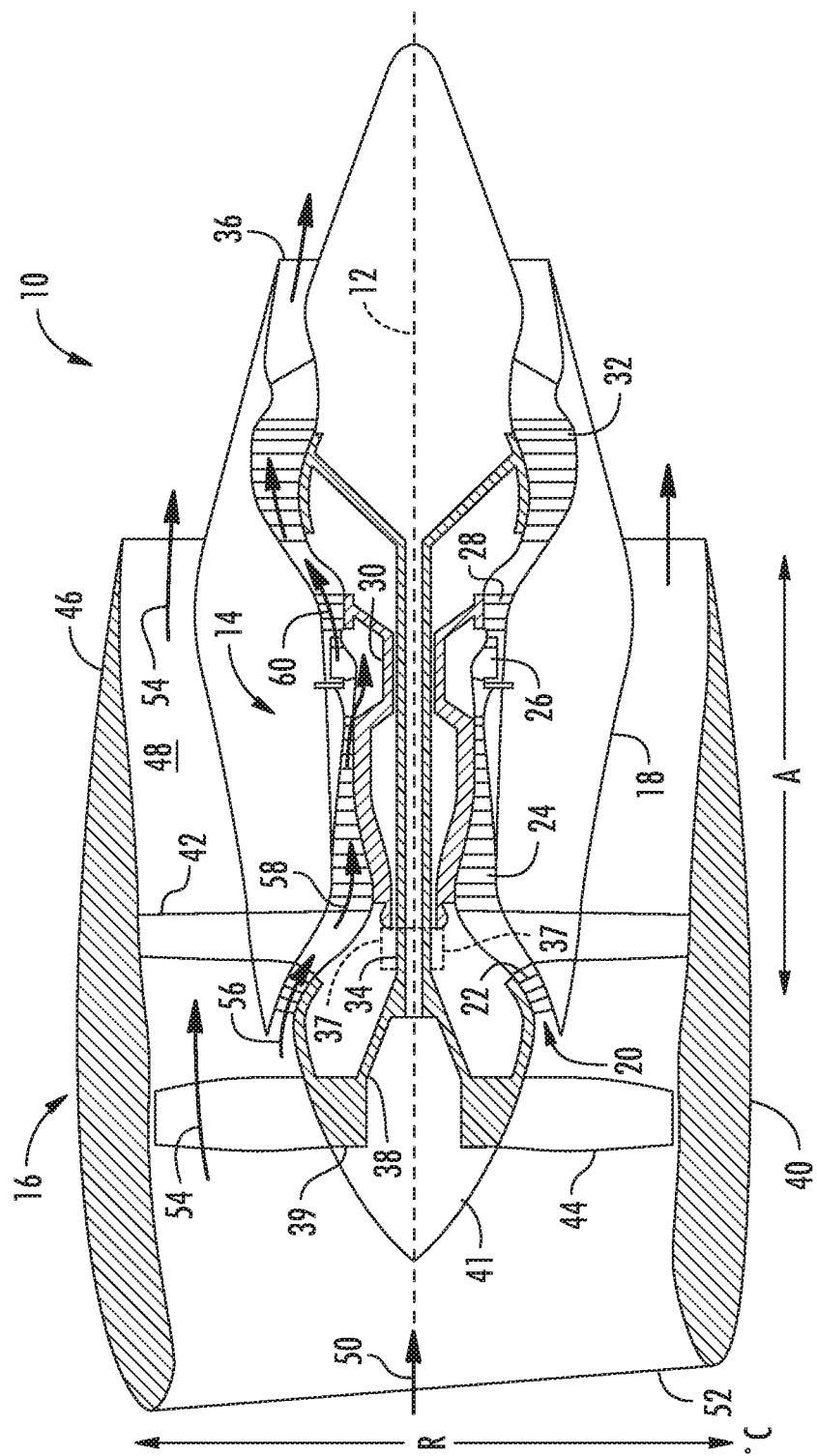
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A support assembly for a bearing of a gas turbine engine is generally provided. The support assembly generally supports a bearing supporting a rotating shaft of the gas turbine engine. The support assembly includes an outer race radially exterior to the bearing to support the bearing and a damper radially exterior to the outer race to both support and provide damping to the outer race. Additionally, the support assembly includes a spring finger ring positioned radially exterior to the outer race. The spring finger ring includes an outer ring positioned near the damper and an inner ring positioned radially interior to the outer ring to define a gap between the inner and outer rings. Additionally, a plurality of spring fingers extends between the inner and outer rings to provide damping to the outer race. At least a portion of the spring fingers are two-sided spring fingers. Each two-sided spring finger includes a first ligament coupled to the outer ring and extending at a first circumferential angle to a first radial bumper near the inner ring at a first circumferential location to define a first circumferential side. Each two-sided spring finger further includes a second ligament coupled to the inner ring at a second circumferential location and extending at a second circumferential angle to a second radial bumper near the outer ring to define a second circumferential side. The second circumferential angle being different than the first circumferential angle. Moreover, each of the two-sided spring fingers defines a first radial gap between the first radial bumper and inner ring and a second radial gap between the second radial bumper and the outer ring. In several embodiments, the spring finger ring may further include a shape memory alloy. As such, the spring finger ring may provide damping under compression as the radial gaps between the inner and outer rings and the bumpers are closed as well as damping provided from the shape memory alloy. As such, the support assembly may generally allow for hysteresis damping and variable geometry to allow for adaptive stiffness. Additionally, the support assembly may reduce the weight of the gas turbine engine and lead to increased efficiency. Further, by including a shape memory alloy, the support assembly may allow for backup damping in a no oil condition. Additionally, the placement of the spring finger ring may prevent or reduce bearing coning and thereby enhance the bearing performance.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular nacelle 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the nacelle 40 may be configured to be supported relative to the core engine 14 by a plurality of substantially radially-extending, circumferentially-spaced outlet guide vanes 42. As such, the nacelle 40 may enclose the fan rotor 38 and its corresponding fan rotor blades (fan blades 44). Further, as shown, each of the fan blades 44 may extend between a root and a tip in the radial direction R relative to the centerline 12. Moreover, a downstream section 46 of the nacelle 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the nacelle 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
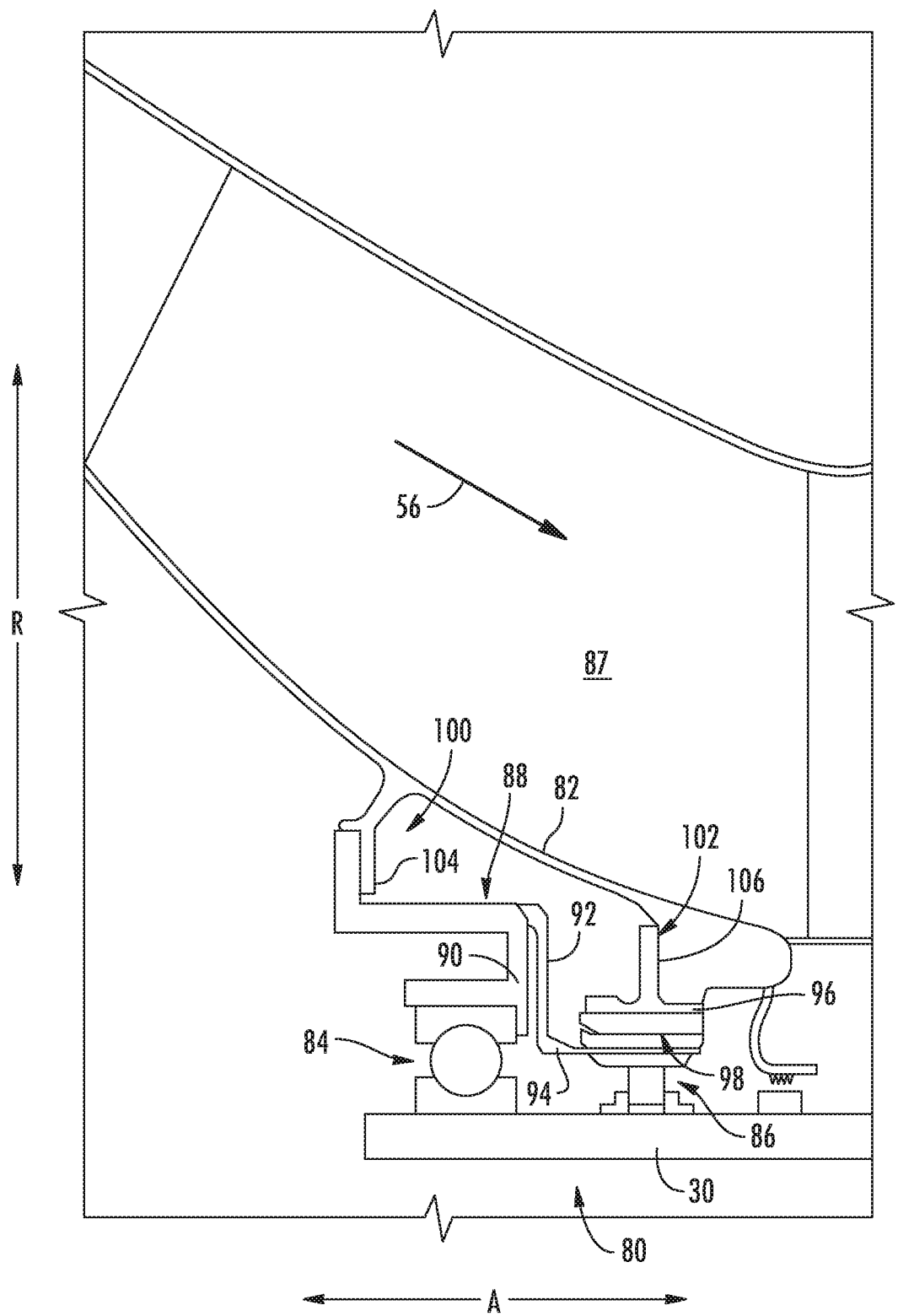
FIG. 2 illustrates a cross-sectional view of the compressor section of FIG. 1 in accordance with aspects of the present subject matter, particularly illustrating a forward end of a high pressure shaft.

Referring now to FIG. 2, a close-up view of a cross-section of the compressor section of the gas turbine engine 10 of FIG. 1 is provided. Specifically, FIG. 2 shows a forward end 80 of the HP shaft 30. The forward end 80 of the HP shaft 30 is positioned within the compressor section of the turbine engine 10, radially inward of a core air flowpath 87 for the second compressed airflow 56 flowing through the core engine 14. Notably, for the depicted embodiment, the core air flowpath 87 is defined at least in part by a static frame 82 within the compressor section of the gas turbine engine 10. For the illustrated embodiment, the static frame 82 is configured as a single piece unit. However, in some other embodiments, the static frame 82 may instead be formed of a plurality of members attached and configured in any suitable manner.

Still referring to the exemplary embodiment of FIG. 2, the turbine engine 10 includes a bearing supporting rotation of the HP shaft 30 at the forward end 80. More particularly, the turbine engine 10 includes a forward bearing 84 and an aft bearing 86, the forward and aft bearings 84, 86 each supporting rotation of the HP shaft 30 at the forward end 80 of the HP shaft 30. In these embodiments, the bearing is a load-bearing unit designed to bear the load of the shaft 30. In the illustrated embodiment, the forward bearing 84 is configured as a thrust bearing including a ball bearing, and the aft bearing 86 is configured as a roller bearing including a roller element bearing. It should be appreciated however that in other embodiments, the forward and/or aft bearings 84, 86 may instead have any other suitable form or configuration. Further, in some other embodiments, the turbine engine 10 may only include a single bearing for supporting the forward end 80 of the HP shaft 30. Additionally, it should be appreciated that FIG. 2 is provided only to place the subject matter in an exemplary field of use, and the bearing (s) 84, 86 may be included at any other position along the HP shaft 30, along the LP shaft 34 (FIG. 1), or any other suitable rotating shaft of the gas turbine engine 10 or other suitable gas turbine engine.

The gas turbine engine 10 may additionally include a support element 88 supporting the bearing, e.g., supporting either or both the forward bearing 84 and the aft bearing 86. More particularly, the support element 88 depicted includes a plurality of individual ribs spaced along a circumferential direction C (see, for example, FIG. 4). The plurality of ribs may include forward bearing support ribs 90 and aft bearing support ribs 92. In the embodiment shown in FIG. 2, the support element 88 is configured as a "squirrel casing" for the forward and aft bearings 84, 86. Additionally, the aft bearing support ribs 92 may include an axial member 94 extending generally along the axial direction A for supporting the aft bearing 86. The ribs 90, 92 of the support element 88 may be formed of a material (e.g., a metal) capable of bending or flexing during operation of the turbine engine 10 to provide a certain amount of damping for the forward and aft bearings 84, 86.

Figure 3:
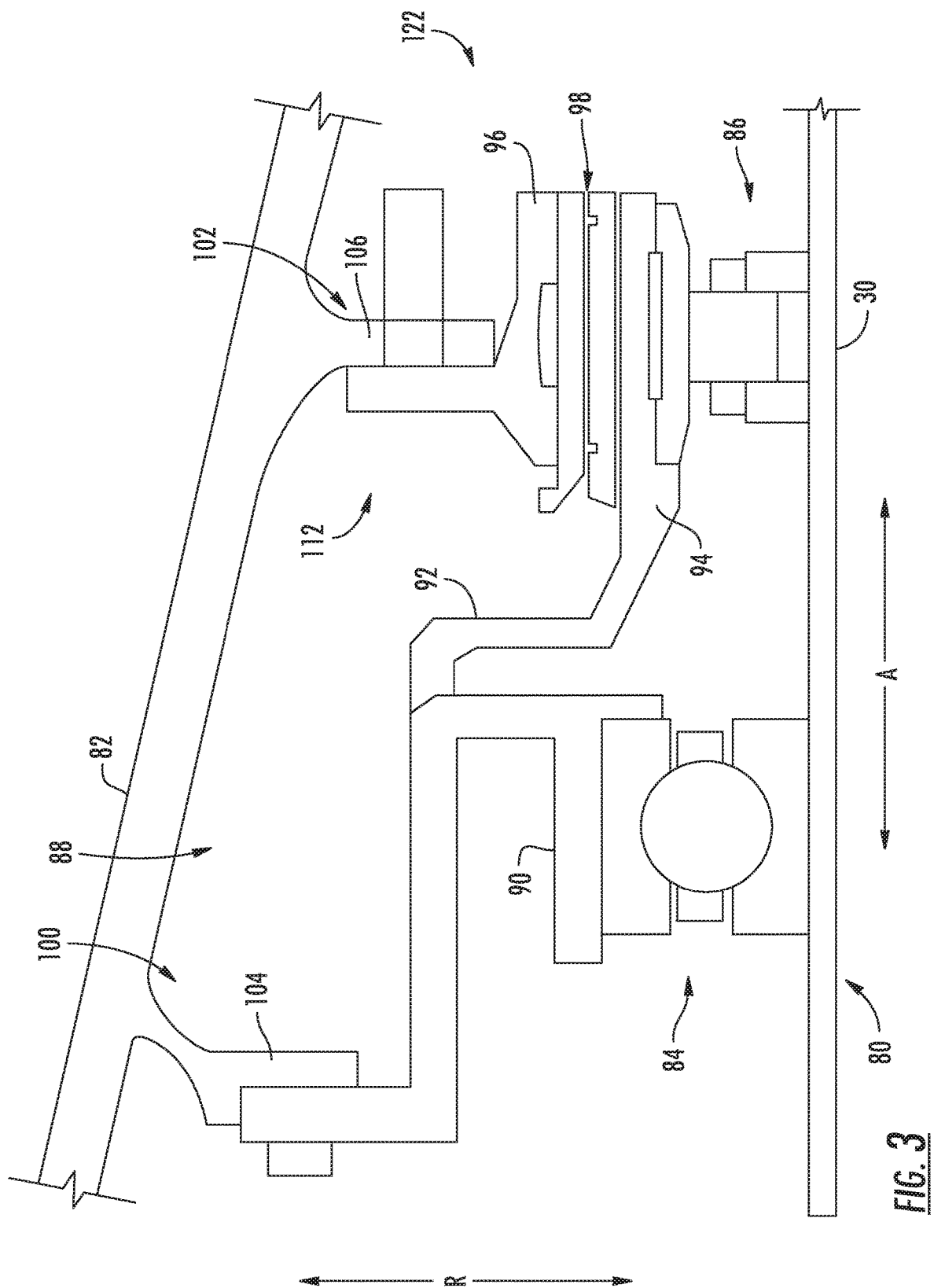
FIG. 3 illustrates a close-up view of one embodiment of forward and aft bearings of FIG. 2 in accordance with aspects of the present subject matter.

FIG. 3 provides a close-up view of one embodiment of the forward and aft bearings 84, 86 of FIG. 2. In FIG. 3, the gas turbine engine 10 may further include a damper 112 that may include a squeeze film damper 96 for providing additional damping of the aft bearing 86. The squeeze film damper 96 receives a flow of fluid such as lubrication oil during operation. The squeeze film damper 96 provides such fluid to a support surface 98 to generate a thin film of such fluid. Dynamic forces acting on the HP shaft 30 and aft bearing 86 may be absorbed or dampened by squeezing out the fluid on the support surface 98. Notably, the support element 88 is attached to the static frame 82 at a first location 100, and, for the embodiment depicted, the squeeze film damper 96 is attached to the static frame 82 at a second location 102. More particularly, for the depicted embodiment, the support element 88 is attached directly, without any intervening components, to a first attachment flange 104 of the static frame 82 at the first location 100, and the squeeze film damper 96 is attached directly to a second attachment flange 106 of the static frame 82 at the second location 102. The first location 100 is spaced from the second location 102. Specifically, for the embodiment depicted, the first location 100 is spaced from the second location 102 at least as far as the forward bearing 84 is spaced from the aft bearing 86. However, in other embodiments (see FIGS. 4 and 7-8) one support element 88 may be attached at one location of the static frame 82 to support a single bearing, or, alternatively, each of the forward and aft bearings 84, 86 may include separate support elements 88 attached to the first and second attachment flanges 104, 106 respectively. Additionally, though the squeeze film damper 96 is illustrated between the support element 88 and the static frame 82 in the embodiment of FIG. 3, it should be appreciated that in other embodiments, the squeeze film damper may be arranged radially inward of the support element 88 between the support element 88 and the bearing (e.g., the aft bearing 86).

In order to further provide damping to the bearings, a support assembly 122 (as described in regard to FIG. 4) of the present gas turbine engine 10 may include a spring finger ring 110 (FIG. 4) supporting at least one of the support element 88, or a bearing, such as the forward bearing 84 or aft bearing 86. The spring finger ring 110 may include a shape memory alloy. The spring finger ring 110 may be positioned in between the support element 88 and the bearing. In some other embodiments, the spring finger ring 110 may be positioned in between the support element 88 and the static frame 82. In additional or alternative embodiments, the spring finger ring 110 may be a component of the support element 88.

Figure 4:
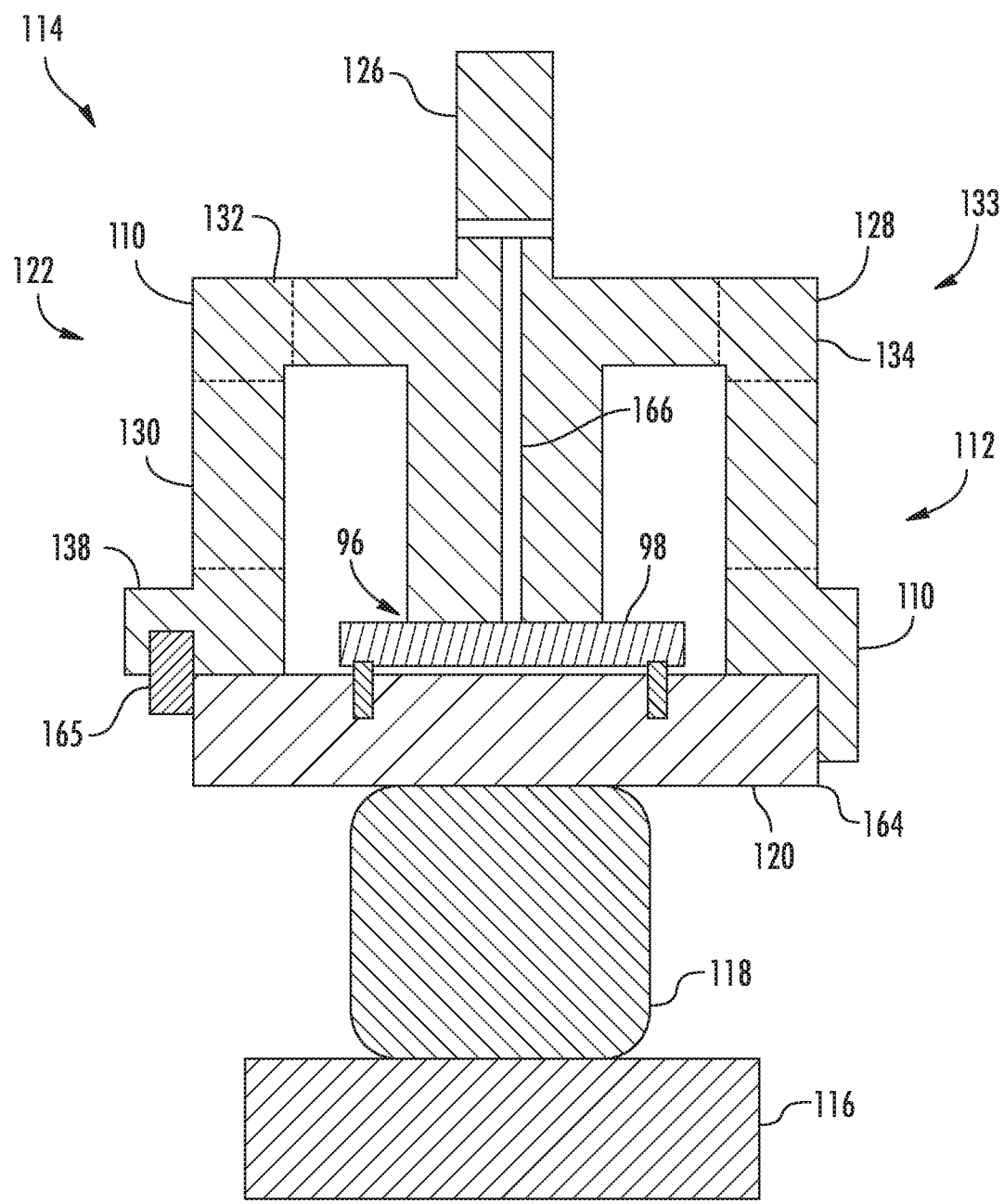
FIG. 4 illustrates a pictorial view of one embodiment of a bearing assembly in accordance with aspects of the present subject matter.

Referring now FIG. 4, a pictorial view of one embodiment of a bearing assembly 114 is illustrated in accordance with aspects of the present subject matter. The bearing assembly 114 may be utilized to support a rotating shaft (e.g. the HP or LP shafts 30, 34 not shown). Particularly, in the illustrated embodiment, the bearing assembly 114 is illustrated as supporting a roller bearing such as the aft bearing 86 of FIG.

3. However, in other embodiments, it should be appreciated that the bearing assembly 114 may be utilized to support a thrust bearing, such as forward bearing 84 of FIG. 3, or any other ball bearing(s), roller bearing(s), or any other suitable configuration of a bearing.

As shown, the bearing assembly 114 may include an inner race 116 coupled either directly or indirectly to one of the rotating shafts, not shown, of the gas turbine engine 10. For instance, the inner race 116 may be coupled to the HP or LP shaft 30, 34. As shown, a bearing 118 may be positioned radially exterior to the inner race 116 in order to support inner race 116 and thereby the rotating shaft of the gas turbine engine 10. Though one bearing 118 is illustrated in the embodiment of FIG. 4 for convenience, it should be appreciated that a plurality of bearings 118 may be arranged between the inner and outer races 116, 120 in the circumferential direction C. Though the bearing 118 is illustrated as a roller bearing, it should be appreciated that the bearing 118 may be a ball bearing, such as a ball bearing utilized in the forward bearing 84 of FIG. 3. As shown, the bearing assembly 114 may include the outer race 120 positioned radially exterior to the bearing 118. For instance, the bearing 118 may be sandwiched between the inner and outer races 116, 120 in the radial direction R. It should be appreciated that the bearing 118 may allow the inner race 116 and rotating shaft to rotate with respect to the outer race 120, which may be coupled to the static frame 82 (see, e.g., FIGS. 2 and 3) through various other components of the bearing assembly 114. As such, the bearing 118 may allow such relative rotation while still supporting the inner race 116 and thus the rotating shaft and associated components of the gas turbine engine 10.

The bearing assembly 114 may further include a support assembly 122 for the bearing 118 of the gas turbine engine 10. The support assembly 122 may include the outer race 120 supporting the bearing 118. The support assembly 122 may further include the damper 112 positioned radially exterior to the outer race 120. The damper 112 may support the outer race 120 while also providing damping to the outer race 120 and thus to the bearing 118 and subsequently the rotating shaft. In several configurations, the damper 112 may include a squirrel casing 126. For instance, the squirrel casing 126 may be a component of or attached to the support element 88 (see FIGS. 2 and 3) or may be an individual component coupled directly or indirectly to the static frame 82. It should be appreciated that the damper 112 may be directly or indirectly coupled to the outer race 120. As shown, the squirrel casing 126 may include a plurality of fingers or ribs 128. Moreover, the ribs 128 may flex or bend during operation of the gas turbine engine 10 in order to dampen forces acting on or through the bearing(s) 118 and/or the rotating shaft. For instance, in one embodiment, the ribs 128 may correspond to the forward bearing support ribs 90 or aft bearing support ribs 92. Additionally, the ribs 128 may include one or more radially aligned ribs or rib portions (radial ribs 130). The radial ribs 130 may generally dampen forces acting through in the radial direction R. The ribs 128 may also include one or more axially aligned ribs or rib portions (axial ribs 132). The axial ribs 132 may generally dampen forces acting in the axial direction A.

As further illustrated in FIG. 4, the spring finger ring 110 (as described in more detail below in regard to FIGS. 5 and 6) may be positioned radially exterior to the outer race 120. For instance, the spring finger ring 110 may be formed integrally with or coupled to the squirrel casing 126 at radially interior portion 133 of the squirrel casing 126. More particularly, for the embodiment shown, one or more radial ribs 130 may be configured as the spring finger ring(s) 110. As described in more detail in regard to FIGS. 5 and 6, an outer ring 134 of the spring finger ring 110 may be coupled to or formed integrally with the squirrel casing 126 at the axial rib 132, and an inner ring 138 of the spring finger ring 110 may be coupled to or formed integrally with the outer race 120. Though one embodiment of a damper 112 including a squirrel casing 126 is illustrated in FIG. 4, it should be appreciated that the spring finger ring 110 may be coupled to a radially interior portion of any squirrel casing or damper or formed integrally with such damper, such as a squeeze film damper (e.g., the squeeze film damper 96 of FIG. 3).

As further shown in FIG. 4, the support assembly 122 may be an assembly of the damper 112 including the squirrel casing 126 and/or the squeeze film damper 96 and the spring finger ring 110 arranged exterior to the outer race 120. As shown, the support surface 98 of the squeeze film damper 96 may be press fitted between the damper 112 and the outer race 120. Moreover, the support surface 98 may be secured to the damper 112 and/or the outer race 120. For instance, the outer race 120, press fitting the support surface 98, may be fitted into a shoulder 164 of the squirrel casing 126. Additionally, as shown the outer race 120 may be secured in place using a snap ring 165 between the outer race 120 and the squirrel casing 126. Moreover, the squirrel casing 126 may define a fluid supply 166 through and/or along the squirrel casing 126 to provide a fluid to the squeeze film damper 96. For instance the fluid supply 166 may provide lubrication oil.

Figure 5:
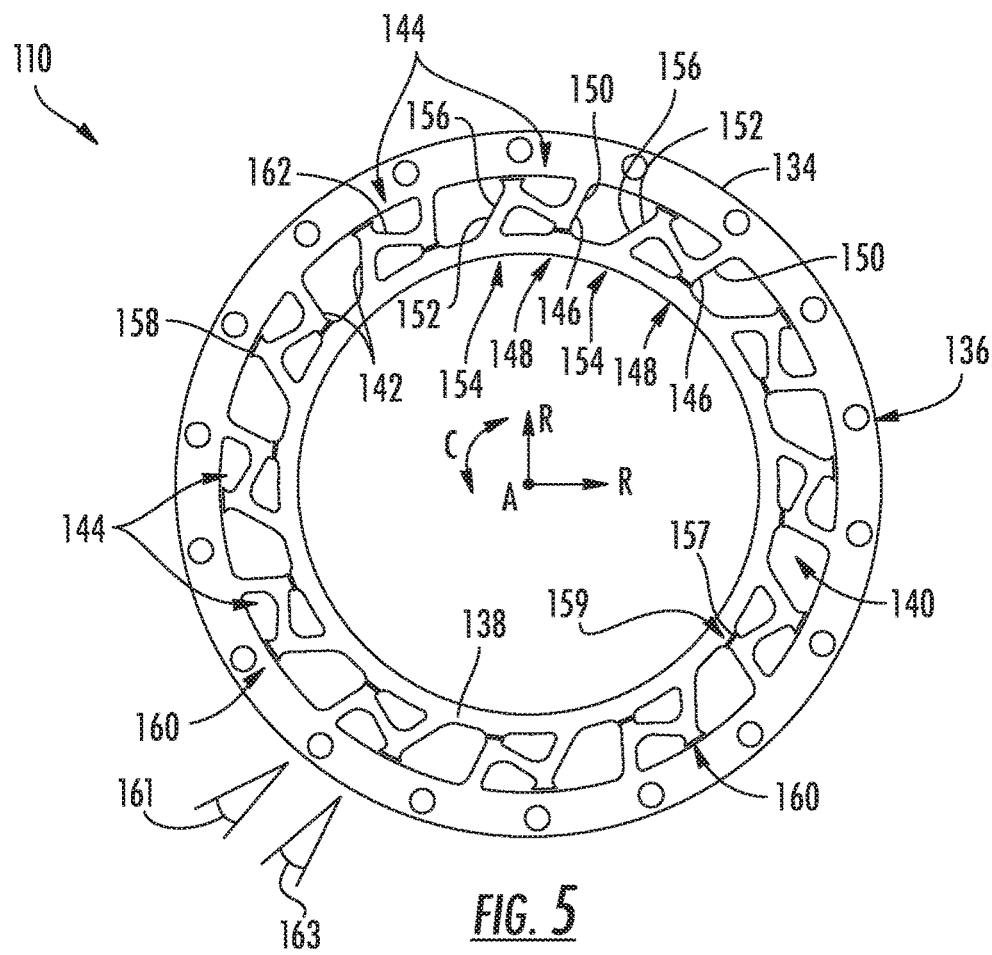
FIG. 5 illustrates a front view of one embodiment of spring a finger ring in accordance with aspects of the present subject matter.
Figure 6:
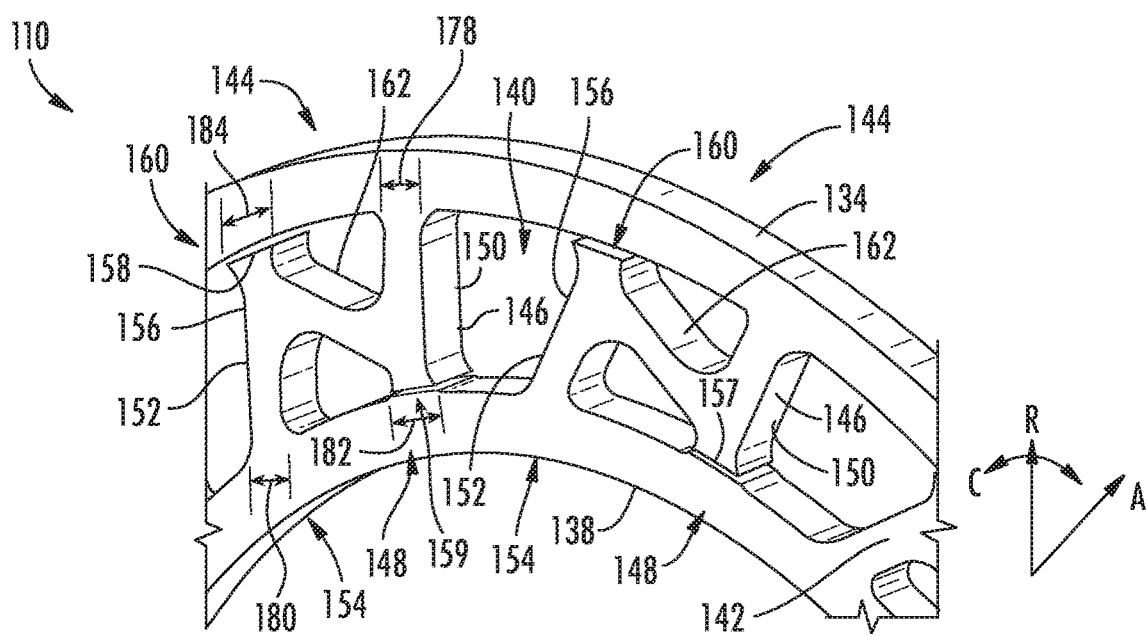
FIG. 6 illustrates a side view of the spring finger ring of FIG. 5 in accordance with aspects of the present subject matter.

Referring now to FIGS. 5 and 6, multiple views of embodiments of the spring finger ring 110 are illustrated in accordance with aspects of the present subject matter. Particularly, FIG. 5 illustrates a front view of the spring finger ring 110, and FIG. 6 illustrates a closer pictorial view of a spring finger ring 110. The spring finger ring 110 may generally be positioned radially exterior to the outer race 120. For example, in several embodiments, the spring finger ring 110 may be positioned between the outer race 120 and damper 112 (see, e.g., FIGS. 3 and 4) of any bearing assembly 114. Moreover, the spring finger ring 110 may be utilized within any suitable gas turbine engine 10, such as, but not limited to, the gas turbine engine 10 of FIG. 1. The spring finger ring 110 may generally provide damping of the outer race 120 and through the outer race 120 the bearing 118 and rotating shaft. Further, the spring finger ring 110 may generally provide damping of forces acting in the radial direction R.

As illustrated, the spring finger ring 110 may include an outer ring 134 proximate to the damper 112 (FIG. 4). The outer ring 134 may be formed with the damper 112, or a component thereof, or may be coupled to the damper 112. As shown particularly in FIG. 5, the outer ring 134 may include a number of bolt holes 136 such that the outer ring 134 may be fastened to the damper 112 using bolts, screws, rivets, or other suitable fasteners. Additionally, the outer ring 134 may be otherwise coupled to the damper 112, such as via adhesion, welding, brazing, etc. In a still further embodiment, the outer ring 134 may be coupled directly to the static frame 82. The spring finger ring 110 may further include an inner ring 138 positioned radially interior to the outer ring 134. The inner ring 138 may be coupled to or formed integrally with the outer race 120 (FIG. 4). Moreover, the inner ring 138 and outer ring 134 may define a gap 140 therebetween. More particularly, the gap 140 may extend along the circumferential direction C and axial direction A between the outer and inner rings 134, 138.

Referring still to the embodiments illustrated in FIGS. 5 and 6, the spring finger ring 110 may include a plurality of spring fingers 142 extending between the inner and outer rings 138, 134 in order to provide damping of the outer race 120. For instance, the spring fingers 142 may extend generally in the radial direction R or partially in the radial and circumferential directions R, C. As such, the spring fingers 142 may bend or flex in order to dampen forces acting on the outer race 120, the bearing 118, and/or the rotating shaft.

As further shown in FIGS. 5 and 6, at least a portion of the spring fingers may be configured as two-sided spring fingers 144. For instance, as shown in FIG. 5, each of the spring fingers 142 may be configured as two-sided spring fingers 144. The two-sided spring finger(s) 144 may each include a first ligament 146 coupled to, integrally coupled to, or formed integrally with the outer ring 134 and extending within the gap 140. For example, the first ligament 146 may extend at least partially in the radial direction R within the gap 140 to a first radial bumper 157 at a first circumferential location 148 of the inner ring 138 in order to define a first circumferential side 150 of each of the two-sided spring fingers 144. In certain embodiments, the first ligament 146 may also extend at least partially in the circumferential direction C. In the illustrated embodiment, each of the two-sided spring fingers 144 may define a first radial gap 159 between the first radial bumper 157 and the inner ring 138. For instance, the first radial gap 159 may be defined between the inner ring 138 and the first radial bumper 157 at the first circumferential location 148. As such, forces acting on the spring finger ring 110 may put at least a portion of the outer and inner rings 134, 138 in compression and close the first radial gap 159 between the inner ring 138 and the first radial bumper 157.

As further illustrated, the two-sided spring fingers 144 may each include a second ligament 152 coupled to, integrally coupled to, or formed integrally with the inner ring 138 at a second circumferential location 154 and extending within the gap 140. For instance, the second ligament 152 may extend at least partially in the radial direction R within the gap 140 to a second radial bumper 158 proximate to the outer ring 134 in order to define a second circumferential side 156 of each of the two-sided spring fingers 144. In certain embodiments, the second ligament 152 may also extend at least partially in the circumferential direction C. In the illustrated embodiment, each of the two-sided spring fingers 144 may define a second radial gap 160 between the second radial bumper 158 and the outer ring 134. As such, forces acting on the spring finger ring 110 may put at least a portion of the outer and inner rings 134, 138 in compression and close the second radial gap 160 between the outer ring 134 and the second radial bumper 158.

As shown, the first and second ligaments 146, 152 may extend at circumferential angles defined relative to the radial direction R. As shown particularly in regard to FIG. 5, each of the first ligaments 146 of the two-sided spring fingers 144 may extend with within the gap 140 at a first circumferential angle 161 defined relative to the radial direction R (relative to the centerline 12 and axial direction A). As further shown particularly in FIG. 5, each of the second ligaments 152 of the two-sided spring fingers 144 may extend within the gap 140 at a second circumferential angle 163 defined relative to the radial direction R. In certain embodiments, the second circumferential angle 163 may be different than the first circumferential angel 161. For example, as shown in FIG. 5, the second circumferential angle 163 may be greater than the first circumferential angle 161. However, it should be appreciate that in additional or alternative embodiments, one or more of the two-sided spring fingers 144 (such as all of the two-sided spring fingers 144) may include first and second ligaments 146, 152 defining a larger first circumferential angle 161 than the second circumferential angle 163.

Referring still to the embodiments of FIGS. 5 and 6, in certain embodiments, each of the radial gaps 159, 160 may be between 0.1 millimeters and 20 millimeters when the spring finger ring 110 is unstrained (e.g., when no forces are transmitted through the spring finger ring 110). For instance, in one example, one or more of the radial gaps 159, 160 may be between 0.1 and 8 millimeters (such as between 0.1 millimeters and 2 millimeters) when the spring finger ring 110 is unstrained. In an exemplary embodiment, the first radial bumper 157 and inner ring 138 may define the first radial gap 159 different than the second radial gap 160 defined between the second radial bumper 158 and the outer ring 134. For example, the first radial gap 159 may be larger than the second radial gap 160 for one or more of the two-sided spring fingers 144 (such as all of the two-sided spring fingers 144). However, in additional or alternative embodiments, one or more of the two-sided spring finger rings 144 (such as all of the two-sided spring finger rings 144) may define the second radial gap 160 larger than the first radial gap 159.

Referring now particularly to the embodiment of FIG. 6, in one particular embodiment, one or more of the radial bumpers 157, 158 of the two-sided spring fingers 144 may define circumferential widths greater than circumferential widths of the first and/or second ligaments 146, 152. For instance, the first ligament 146 may define a first ligament width 178 in the circumferential direction C. Similarly, the second ligament 152 may define a second ligament width 180 in the circumferential direction C. In certain embodiments, the one or more of the two-sides spring fingers 144 may define first and second ligament widths 178, 180 the same or approximately the same. However, in additional or alternative embodiments, one or more of the two-sided spring fingers 144 may define different first and second ligament widths 178, 180. Still referring particularly to FIG. 6, the first radial bumper 157 may define a first bumper width 182 in the circumferential direction C. Similarly, the second radial bumper 158 may define a second bumper width 184 in the circumferential direction C. In an exemplary embodiment, the first bumper width 182 may be larger than the first ligament width 178. In an additional or alternative embodiment, the first bumper width 182 may be larger than the second ligament width 180. As further shown in the exemplary embodiment of FIG. 6, the second bumper width 184 may be larger than the second ligament width 180. In an additional or alternative embodiment, the second bumper width 182 may be larger than the first ligament width 178. As such, in certain embodiments, the first and second bumper widths 180, 182 of one or more of the two-sided spring fingers may each be larger than the first and second ligament widths 178, 180.

It should be appreciated that bumper widths 182, 184 larger than the ligament widths 178, 180 may increase the contact area between the bumpers 157, 158 and the inner and outer rings 138, 134, respectively. Moreover, by increasing the contact area, a spring finger ring 110 in compression may more consistently close the radial gaps 159, 160. For example, undesirable twist or deflections in the axial direction of the spring fingers 142 may be reduced by increasing the contact area. Additionally, increasing such contact area may reduce the risk of damage to the spring fingers 142.

In certain embodiments, as shown, each of the two-sided spring fingers 144 may include a third ligament 162 coupled to, integrally coupled to, or formed integrally with and extending between the first radial bumper 157 and the second radial bumper 158. As such, the third ligament 162 may further increase the stiffness provided by the two-sided spring fingers 144.

In several embodiments, such as the embodiments of FIGS. 5 and 6, the spring finger ring 110 may be configured to provide variable stiffness. For instance, the different radial gaps 159, 160 and circumferential angles 161, 163 may allow for different stiffnesses of the spring finger ring 110 based on the amount of compression and/or how much the gap 140 has reduced. As described briefly above, one of the radial gaps 159, 160 may be larger than the other. For instance, the second radial gap 160 may be smaller than the first radial gap 159. As such, forces acting on the spring finger ring 110 may close the second radial gap 160 before the first radial gap 159. More particularly, one or more of the two-sided spring fingers 144 may define a first stiffness as the two-sided spring finger(s) 144 bend and deflect before the second radial gap 160 is closed and a second stiffness after the second radial gap 160 is closed. More particularly, once enough force is applied to the two-sided spring finger(s) 144 to close the second radial gap(s) 160, the first and second ligaments 146, 152 may further bend and deflect and define the second stiffness different than the first stiffness, i.e., a higher stiffness.

Furthermore, as the force applied to the spring finger ring 110 continues to increase, the first radial gap 159 (e.g., the larger radial gap) may reduce until the first radial gap 159 closes. More particularly, one or more of the two-sided spring fingers 144 may define the second stiffness as the two-sided spring finger(s) 144 bend and deflect before the first radial gap 159 is closed and a third stiffness after the first radial gap 159 is closed. For example, once enough force is applied to the two-sided spring finger(s) 144 to close the first radial gap(s) 159, the first and second ligaments 146, 152 may further bend and deflect and define the third stiffness different than the second stiffness, i.e., a higher stiffness. It should be appreciated that the incremental change in stiffness between the second stiffness and third stiffness may be larger than the change is stiffness between the first stiffness and the second stiffness. For example, the second ligament 152 defining the larger second circumferential angle 163 may increase the stiffness by a first amount as the second radial gap 160 closes and the bending and/or deflection of the second ligament 152 increases. Furthermore, the first ligament 146 defining the smaller first circumferential angle 151 may increase the stiffness by a second amount greater than the first amount as the first radial gap 159 closes and the bending and/or deflection of the first ligament 146 increases. Moreover, it should be appreciated that the first ligament 146 more radially aligned (e.g., defining the smaller first circumferential angle 161) may provide a greater increase in stiffness as the first ligament 146 is bent and/or deflected as compared to the second ligament 152 less radially aligned (e.g., defining the larger second circumferential angle 163).

In further embodiments, the first radial gap 159 may be smaller than the second radial gap 160, and the first circumferential angle 161 may be larger than the second circumferential angle 163 such that the first radial gap 159 closes first. As such, subsequent deflections and/or bending of the second ligament 152 provide a greater increase in stiffness to the spring finger ring 110 than deflections and/or bending of the first ligament 146.

It should be appreciated that such configurations as illustrated in FIGS. 5 and 6 may allow for the stiffness provided by the spring finger ring 110 to incrementally increase as the forces applied to the spring finger ring 110 increase. For example, the stiffness provided by the spring finger ring 110 may increase as one or more of the second radial gaps 160 close. The stiffness may further increase as one or more of the first radial gaps 159 close. Additionally, as explained above, the increase in the change of stiffness may be greater as the first radial gaps 159 closes as compared to the increase in stiffness as the second radial gaps 160 close.

In several embodiments, the spring finger ring 110 may be integrally formed. For instance, the outer and inner rings 134, 138 and plurality of spring fingers 142 may be formed as a single unitary piece via casting or additive manufacturing. In other embodiments, some or all of the inner ring 138, outer ring 134, and spring fingers 142 may be coupled together integrally, such as via welding, adhesives, brazing, etc. In one particular embodiment, the spring finger ring 110 may be printed via additive manufacturing directly on or with the damper 112 and/or the outer race 120. However, in other embodiments, the spring finger ring 110 may separately be formed via additive manufacturing and then integrally coupled to the damper 112 and/or the outer race 120, such as via bonding with a resin or adhesive or welding.

In several embodiments, the spring finger ring 110 may include a shape memory alloy (SMA) material. For instance, one or more of the inner ring 138, outer ring 134, or spring fingers 142 may each include an SMA material. In certain embodiments the entire spring finger ring 110 may be integrally formed, e.g., such as via additive manufacturing, from an SMA material. In some embodiments, the spring finger ring 110 may include the SMA material as a major constituent, in an amount greater than 50 wt. % of the spring finger ring 110. In certain embodiments, the spring finger ring 110 may be essentially composed of the SMA material.

A SMA is generally an alloy capable of returning to its original shape after being deformed. Further, SMAs may act as a lightweight, solid-state alternative to traditional actuators. For instance, certain SMAs may be heated in order to return a deformed SMA to its pre-deformed shape. A SMA may also provide varying stiffness, in a pre-determined manner, in response to certain ranges of temperatures. The change in stiffness of the shape memory alloy is due to a temperature related, solid state micro-structural phase change that enables the alloy to change from one physical shape to another physical shape. The changes in stiffness of the SMA may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of the spring finger ring 110 intended to change stiffness during operation of the support assembly 122, the spring finger ring 110 may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the spring finger ring 110 has a first stiffness at a first temperature and has a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Exemplary but non-limiting examples of SMAs that may be suitable for forming the spring finger ring 110 may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a nickel-aluminum based alloys, copper-aluminum-nickel alloy, or alloys containing zinc, copper, gold, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMAs may also display superelasticity. Superelasticity may generally be characterized by recovery of large strains, potentially with some dissipation. For instance, martensite and austenite phases of the SMA may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

In some embodiments, the spring finger ring 110 may be in a pre-strained or pre-stressed condition. The spring finger ring 110 in the pre-stressed condition may shift the hysteresis cycle of the shape memory alloy spring finger ring 110 to a range of stresses that is different from that of a non-pre-stressed spring finger ring 110. The pre-stressing further serves to maximize the damping function of the shape memory alloy spring finger ring 110 so that the material is active at the maximum stresses generated. More particularly, placing the spring finger ring 110 in a pre-stress position may allow for the spring finger ring 110 to enter a hysteretic bending regime, without requiring a relatively large amount of displacement. For instance in certain embodiments, the spring finger ring 110 may be prestressed between 70 GPa and 150 GPa.

Referring now to FIGS. 7 and 8, multiple views of several embodiments of bearing assemblies 114 and support assemblies 122 are illustrated in accordance with aspects of the present subject matter. Particularly, each view shows a different arrangement of the spring finger ring 110 in regard to the other components of the bearing assembly 114 and support assembly 122. For example, FIGS. 7 and 8 illustrate multiple views of the various components of the support assembly 122 integrally formed. For example, components of the support assembly 122, such as the outer race 120, the spring finger ring 110, and the damper 112 may be formed integrally together. More particularly, such components may be cast together, manufactured together using additive manufacturing, welded together, braised together, adhered together, or bonded together such that the components are no longer easily seperatable. As shown particularly in FIG. 7, the damper 112 may be formed integrally with or coupled integrally with the spring finger ring 110. For instance, the spring finger ring 110 may be formed integrally with or coupled integrally with the squirrel casing 126. In an additional or alternative embodiment, the spring finger ring 110 may be configured as the squirrel casing 126. In additional or alternative embodiments, as shown in FIG. 8, the spring finger ring 110 may be formed integrally with or coupled integrally with the outer race 120. As shown particular in FIG. 8, in some embodiments, the spring finger ring 110 may formed integrally with or coupled integrally to both the outer race 120 and the damper 112, such as the squirrel casing 126. It should be appreciated that the dampers 112 of FIGS. 7 and 8 may also include squeeze film damper 96 (see, e.g., FIGS. 3 and 4).

Referring now to FIGS. 9 and 10, an embodiment of stacked spring finger rings 110 that may be utilized in a support assembly 122 are illustrated in accordance with aspects of the present subject matter. More particularly, FIG. 9 illustrates a front view of stacked spring finger rings 110, and FIG. 10 illustrates a side view of spring finger rings 110. It should be appreciated that the stacked spring finger rings 110 may be utilized in any suitable support assembly, such as the support assembly 122 of FIGS. 2-4, and 7-8. Additionally, each spring finger ring 110 may generally be configured as the spring finger ring 110 of FIGS. 5 and 6. For example, each spring finger ring 110 may include the inner ring 138, outer ring 134, and spring fingers 142 (configured as two-sided spring fingers 144). As shown, a first spring finger ring 172 may be axially forward of a second spring finger ring 174. Additionally, as shown particularly in FIG. 10, a third spring finger ring 176 may be positioned axially aft of the second spring finger ring 174 such that the second spring finger ring 174 is sandwiched between the first and third spring finger rings 172, 176. It should be appreciated that the support assembly 122 may include more or less than three spring finger rings 110 as necessary or desired in order to provide damping to the bearing 118 and/or the rotating shaft. In certain embodiments, each of the spring finger rings 110 may be configured the same or substantially the same. Moreover, each of the spring finger rings 110 may have the same or approximately the same stiffness such that the spring finger rings 110 may be stacked in order to provide the desired damping to the support assembly 122. As shown in FIG. 9, the spring finger rings 110 may be rotating about the axial direction A such that the spring fingers 142 are not aligned. However, in another embodiment, the spring finger rings 110 may be aligned in the axial direction A. In such an embodiment, the spring finger rings 110 may provide uniform stiffness at each circumferential location.

In other embodiments, one or more of the spring finger rings 110 may be configured to have a first stiffness, while one or more of the spring finger rings 110 may be configured to have a second stiffness different than the first stiffness. For instance, the first and third spring finger rings 172, 176 may be configured the same or substantially the same to have the first stiffness. Further, the second spring finger ring 174 may be configured to have the second stiffness. It should be appreciated that the spring finger rings 110 may have as many different configurations defining distinct stiffnesses as desired. Moreover, spring finger rings 110 defining distinct stiffnesses may be stacked in order to provide the required damping of the support assembly 122. The stiffness of the spring finger rings 110 may generally be determined based on a thickness of the spring finger rings 110 and the material each spring finger ring 110 is formed from. For instance, the first and third spring finger rings 172, 176 may be formed from a first SMA material to define the first stiffness. In such an arrangement, the second spring finger ring 174 may be formed from a second SMA material or other metal to define the second stiffness. Additionally, the two-sided spring fingers 144 of the spring finger rings 110 may be configured differently in order to provide the different stiffnesses desired. For instance, the first and third spring finger rings 172, 176 may define radial gaps 159, 160 (see, e.g., FIGS. 5 and 6) to provide the first stiffness. As such, the second spring finger ring 174 may define larger or smaller radial gaps 159, 160 in order to provide a smaller or larger second stiffness, respectively. Further, the second spring finger ring 174 may define larger or smaller circumferential angles 161, 163 in order to provide a smaller or larger second stiffness, respectively. Additionally, the spring finger rings 110 may include different numbers of the two-sided spring fingers 144 in order to provide the distinct stiffnesses.

In general, the exemplary embodiments of the support assembly 122, such as the spring finger ring 110, described herein may be manufactured or formed using any suitable process. For instance, the spring finger ring 110 may be stamped or formed from laser electric discharge machining (EDM), milling, etc. However, in accordance with several aspects of the present subject matter, the spring finger ring 110 may be formed using an additive-manufacturing process, such as a 3D printing process, or via casting. The use of such processes may allow the spring finger ring(s) 110 to be formed integrally and/or integrally with other components of the support assembly 122, as a single monolithic component, or as any suitable number of sub-components.

Forming spring finger ring(s) 110 via additive manufacturing may allow the spring fingers 142 to be integrally formed and include a variety of features not possible when using prior manufacturing methods. For example, the additive manufacturing methods described herein enable the manufacture of the ligaments 146, 152, 162 having any suitable size and shape with one or more configurations, some of these novel features are described herein. For instance, the geometry of the spring finger ring(s) 110 and associated structures depicted in FIGS. 5 and 6 may be produced via additive manufacturing methods.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, in various embodiments of the spring finger ring(s) 110 described herein, the material may include an SMA material. Further, in accordance with other exemplary embodiments of the present subject matter, the additively manufactured components described herein may be formed at least in part of materials including but not limited to pure metals, nickel alloys, chrome alloys, titanium, titanium alloys, magnesium, magnesium alloys, aluminum, aluminum alloys, iron, iron alloys, stainless steel, nickel or cobalt based super alloys (e.g., those available under the name Inconel® available from Special Metals Corporation), as well as SMA materials described herein. These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the spring finger ring(s) 110 including the outer ring 134, inner ring 138, and spring fingers 142 as well as components of the support assembly 122, such as the squirrel casing 126 and/or outer race 120. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the spring finger ring(s) 110 described herein. For example, such components may include thin additively manufactured layers and structures, such as the ligaments 146, 152, 162. In addition, the additive manufacturing process enables the manufacture of a single component having different materials such that different portions of the component may exhibit different performance characteristics, such as forming all or part of the spring finger ring(s) 110 from a SMA material. The successive, additive nature of the manufacturing process enables the construction of these novel features. As a result, the support assembly 122 and/or spring finger ring(s) 110 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A support assembly for a bearing of a gas turbine engine including a shaft extending along an axial direction, the support assembly comprising an outer race positioned radially exterior to the bearing such that the outer race supports the bearing; and a spring finger ring positioned radially exterior to the outer race and at least partially supporting the outer race, the spring finger ring comprising an outer ring positioned radially exterior to the outer race; an inner ring positioned radially interior to the outer ring such that the inner ring and outer ring define a gap therebetween; and a plurality of spring fingers extending between the inner and outer rings such that the plurality of fingers provides damping of the outer race, wherein at least a portion of the plurality of spring fingers is configured as two-sided spring fingers and each include a first ligament coupled to the outer ring and extending at a first circumferential angle relative to the axial direction to a first radial bumper proximate to the inner ring at a first circumferential location to define a first circumferential side of each the two-sided spring fingers and a second ligament coupled to the inner ring at a second circumferential location and extending at a second circumferential angle relative to the axial direction, the second circumferential angle different than the first circumferential angle, to a second radial bumper proximate to the outer ring to define a second circumferential side of each of the two-sided spring fingers, and wherein each of the two-sided spring fingers defines a first radial gap between the first radial bumper and the inner ring and a second radial gap between the second radial bumper and the outer ring.

2. The support assembly of clause 1, further comprising an additional damper, wherein the spring finger ring is disposed radially between the outer race and at least a portion of the additional damper.

3. The support assembly of any preceding clause, wherein the second circumferential angle is greater than the first circumferential angle.

4. The support assembly of any preceding clause, wherein at least one of the first radial bumper or the second radial bumper defines a circumferential width greater than a circumferential width of at least one of the first ligament or the second ligament.

5. The support assembly of any preceding clause, wherein each of the two-sided spring fingers further includes a third ligament coupled between the first radial bumper and the second radial bumper.

6. The support assembly of any preceding clause, wherein the spring finger ring is integrally formed.

7. The support assembly of any preceding clause, wherein the spring finger ring comprises a shape memory alloy.

8. The support assembly of any preceding clause, wherein the additional damper comprises at least one of a squeeze film damper or a squirrel casing.

9. The support assembly of any preceding clause, wherein the spring finger ring is formed integrally with at least one of the outer race or the squirrel casing.

10. The support assembly of any preceding clause, wherein the support assembly comprises a plurality of spring finger rings stacked in the axial direction.

11. The support assembly of any preceding clause, wherein the plurality of spring finger rings includes a first spring finger ring defining a first stiffness and a second spring finger ring defining a second stiffness different than the first stiffness.

12. The support assembly of any preceding clause, wherein the spring finger ring is prestressed.

13. The support assembly of any preceding clause, wherein at least one of the first radial gap or the second radial gap is between 0.1 millimeters and 2 millimeters.

14. The support assembly of any preceding clause, wherein each spring finger of the plurality of spring fingers is configured as a two-sided spring finger.

15. A gas turbine engine defining a central axis, the gas turbine engine comprising a shaft extending along the central axis; a compressor attached to the shaft and extending radially about the central axis; a combustor positioned downstream of the compressor to receive a compressed fluid therefrom; a turbine mounted on the shaft downstream of the combustor to provide a rotational force to the compressor; a bearing assembly supporting the shaft, the bearing assembly including an inner race coupled to the shaft, a bearing positioned radially exterior to the inner race and supporting the shaft, and an outer race positioned radially exterior to the bearing such that the bearing is radially positioned between the inner and outer races; and a spring finger ring positioned radially exterior to the outer race and at least partially supporting the outer race, the spring finger ring comprising an outer ring positioned radially exterior to the outer race; an inner ring positioned radially interior to the outer ring such that the inner ring and outer ring define a gap therebetween; and a plurality of spring fingers extending between the inner and outer rings such that the plurality of fingers provides damping of the outer race, wherein at least a portion of the plurality of spring fingers is configured as two-sided spring fingers and each includes a first ligament coupled to the outer ring and extending at a first circumferential angle relative to the axial direction to a first radial bumper proximate to the inner ring at a first circumferential location to define a first circumferential side of each the two-sided spring fingers and a second ligament coupled to the inner ring at a second circumferential location and extending at a second circumferential angle relative to the axial direction, the second circumferential angle different than the first circumferential angle, to a second radial bumper proximate to the outer ring to define a second circumferential side of each of the two-sided spring fingers, and wherein each of the two-sided spring fingers defines a first radial gap between the first radial bumper and the inner ring and a second radial gap between the second radial bumper and the outer ring.

16. The gas turbine engine of any preceding clause, further comprising an additional damper, wherein the spring finger ring is disposed radially between the outer race and at least a portion of the additional damper.

17. The gas turbine engine of any preceding clause, wherein the second circumferential angle is greater than the first circumferential angle.

18. The gas turbine engine of any preceding clause, wherein at least one of the first radial bumper or the second radial bumper defines a circumferential width greater than a circumferential width of at least one of the first ligament or the second ligament.

19. The gas turbine engine of any preceding clause, wherein the spring finger ring comprises a shape memory alloy.

20. The gas turbine engine of any preceding clause, wherein the bearing comprises at least one of a thrust bearing or a roller bearing.

What is claimed is:

1. A support assembly for a bearing of a gas turbine engine including a shaft extending along an axial direction, the support assembly comprising:
   an outer race positioned radially exterior to the bearing such that the outer race supports the bearing; and
   a spring finger ring positioned radially exterior to the outer race and at least partially supporting the outer race, the spring finger ring comprising:
      an outer ring positioned radially exterior to the outer race;
      an inner ring positioned radially interior to the outer ring such that the inner ring and outer ring define a gap therebetween; and
      a plurality of spring fingers extending between the inner and outer rings such that the plurality of fingers provides damping of the outer race, wherein at least a portion of the plurality of spring fingers is configured as two-sided spring fingers and each includes a first ligament coupled to the outer ring and extending at a first circumferential angle relative to a radial direction to a first radial bumper proximate to the inner ring to define a first circumferential side of each the two-sided spring fingers and a second ligament coupled to the inner ring and extending at a second circumferential angle relative to the radial direction to a second radial bumper proximate to the outer ring to define a second circumferential side of each of the two-sided spring fingers, and wherein each of the two-sided spring fingers defines at least one radial gap between at least one of the first radial bumper and the inner ring or between the second radial bumper and the outer ring, and wherein at least one of the first circumferential angle or the second circumferential angle is an angle other than zero degrees.

2. The support assembly of claim 1, wherein each of the two-sided spring fingers defines a radial gap between the first radial bumper and the inner ring.

3. The support assembly of claim 1, wherein each of the two-sided spring fingers defines a radial gap between the second radial bumper and the outer ring.

4. The support assembly of claim 1, wherein the plurality of spring fingers is axially symmetric relative to the axial direction.

5. The support assembly of claim 1, wherein the outer ring defines a radial thickness greater than a radial thickness defined by the inner ring.

6. The support assembly of claim 1, wherein each of the two-sided spring fingers defines a first radial gap between the first radial bumper and the inner ring and a second radial gap between the second radial bumper and the outer ring.

7. The support assembly of claim 1, wherein the at least one radial bumper defines a circumferential width greater than a circumferential width of at least one of the first ligament or the second ligament.

8. The support assembly of claim 1, wherein each of the two-sided spring fingers further includes a third ligament coupled between the first radial bumper and the second radial bumper.

9. The support assembly of claim 1, wherein the spring finger ring is integrally formed.

10. The support assembly of claim 1, wherein the spring finger ring comprises a shape memory alloy.

11. The support assembly of claim 10, wherein the spring finger ring is formed integrally with at least one of the outer race or a squirrel casing.

12. The support assembly of claim 1, wherein the spring finger ring is a first spring finger ring, and wherein the support assembly comprises further comprises:
   a plurality of spring finger rings, including the first spring finger ring, stacked in the axial direction, wherein each spring finger ring of the plurality of spring finger rings is configured as the spring finger ring.

13. The support assembly of claim 12, wherein the plurality of spring finger rings includes a first spring finger ring defining a first stiffness and a second spring finger ring defining a second stiffness different than the first stiffness.

14. The support assembly of claim 1, wherein the spring finger ring is prestressed.

15. The support assembly of claim 1, wherein the at least one radial gap is between 0.1 millimeters and 2 millimeters.

16. The support assembly of claim 1, wherein each spring finger of the plurality of spring fingers is configured as a two-sided spring finger.

17. A gas turbine engine defining a central axis, the gas turbine engine comprising:
   a shaft extending along the central axis;
   a compressor attached to the shaft and extending radially about the central axis;
   a combustor positioned downstream of the compressor to receive a compressed fluid therefrom;
   a turbine mounted on the shaft downstream of the combustor to provide a rotational force to the compressor;
   a bearing assembly supporting the shaft, the bearing assembly including an inner race coupled to the shaft, a bearing positioned radially exterior to the inner race and supporting the shaft, and an outer race positioned radially exterior to the bearing such that the bearing is radially positioned between the inner and outer races; and
   a spring finger ring positioned radially exterior to the outer race and at least partially supporting the outer race, the spring finger ring comprising:
      an outer ring positioned radially exterior to the outer race;
      an inner ring positioned radially interior to the outer ring such that the inner ring and outer ring define a gap therebetween; and
      a plurality of spring fingers extending between the inner and outer rings such that the plurality of fingers provides damping of the outer race, wherein at least a portion of the plurality of spring fingers is configured as two-sided spring fingers and each includes a first ligament coupled to the outer ring and extending at a first circumferential angle relative to a radial direction to a first radial bumper proximate to the inner ring to define a first circumferential side of each the two-sided spring fingers and a second ligament coupled to the inner ring and extending at a second circumferential angle relative to the radial direction to a second radial bumper proximate to the outer ring to define a second circumferential side of each of the two-sided spring fingers, and wherein each of the two-sided spring fingers defines at least one radial gap between the first radial bumper and the inner ring or between the second radial bumper and the outer ring, and wherein at least one of the first circumferential angle or the second circumferential angle is an angle other than zero degrees.

18. The gas turbine engine of claim 17, wherein each of the of the two-sided spring fingers defines a first radial gap between the first radial bumper and the inner ring and a second radial gap between the second radial bumper and the outer ring.

19. The gas turbine engine of claim 17, wherein the spring finger ring comprises a shape memory alloy.

20. The gas turbine engine of claim 17, wherein the bearing comprises at least one of a thrust bearing or a roller bearing.

* * * * *